United States Patent
Blach (10) Patent No.: US 10,414,081 B2
(45) Date of Patent: Sep. 17, 2019

(54) MULTI-SHAFT EXTRUDER

(71) Applicant: Blach Verwaltungs GmbH & Co. KG, Lauffen am Neckar (DE)

(72) Inventor: Josef A. Blach, Ehrwald (AT)

(73) Assignee: BLACH VERWALTUNGS GMBH & CO. KG, Lauffen am Neckar (DE)

( * ) Notice: Subject to any disclaimer, the term of this patent is extended or adjusted under 35 U.S.C. 154(b) by 774 days.

(21) Appl. No.: 14/550,299

(22) Filed: Nov. 21, 2014

(65) Prior Publication Data

US 2015/0138909 A1   May 21, 2015

Related U.S. Application Data

(63) Continuation of application No. PCT/EP2013/060536, filed on May 22, 2013.

(30) Foreign Application Priority Data

May 23, 2012   (AT) ..................................... 608/2012

(51) Int. Cl.
   *B29C 48/27*   (2019.01)
   *B29C 48/40*   (2019.01)
   (Continued)

(52) U.S. Cl.
   CPC .......... *B29C 48/2715* (2019.02); *B29B 7/481* (2013.01); *B29B 7/482* (2013.01);
   (Continued)

(58) Field of Classification Search
   CPC ..... B29C 47/40; B29C 47/402; B29C 47/408; B29C 47/6075; B29C 48/2715;
   (Continued)

(56) References Cited

U.S. PATENT DOCUMENTS

| 4,131,371 A | 12/1978 | Tynan |
| 4,226,671 A | 10/1980 | Christensen |

(Continued)

FOREIGN PATENT DOCUMENTS

| DE | 19607663 A1 * | 9/1997 | ............ B29B 7/485 |
| DE | 19854689 A1 | 6/2000 | |

(Continued)

OTHER PUBLICATIONS

Machine translation of DE 102008016862, accessed via https://worldwide.espacenet.com on Jun. 8, 2017.*

(Continued)

*Primary Examiner* — Marc C Howell
(74) *Attorney, Agent, or Firm* — Tucker Ellis LLP; Michael G. Craig; Heather M. Barnes (57) ABSTRACT

In a multi-shaft extruder for the processing of free-flowing material having a barrel and a plurality of co-rotating, tightly intermeshing conveyor shafts (1 to 3) arranged in parallel which have at least two flights and are each guided in a bore (1' to 3') in the barrel, each conveyor shaft (1 to 3) is spaced with the ridge (O) of one of its flights from the bore wall (1', 2', 3') by a clearance over at least part of the processing length of the extruder, whereas a gap is formed between the ridge (a, b, c) of another of its flights and the bore wall (1', 2', 3'). The conveyor shafts (1 to 3) are arranged in an offset manner relative to each other at an angle such that, at least in one rotational position, the conveyor shaft (2) arranged between two conveyor shafts (1 to 3) is coatable with the free-flowing material on its flanks (A, B) between its ridges (b, O) by means of the gap-forming ridges (a, c) of the two adjacent conveyor shafts (1 and 3), with the said flanks (A, B) being cleanable again from the free-flowing material by means of the ridges (O) of the two adjacent conveyor shafts (1 and 2) spaced from the bore wall (1', 2', 3') by a clearance (Continued)

in at least one further rotational position of the conveyor shaft.

20 Claims, 5 Drawing Sheets

(51) Int. Cl.
    *B29C 48/59*         (2019.01)
    *B29C 48/425*       (2019.01)
    *B29B 7/48*         (2006.01)
    *B29B 7/70*         (2006.01)
    *B29C 48/25*        (2019.01)
    *B29C 48/68*        (2019.01)

(52) U.S. Cl.
    CPC ............... *B29B 7/485* (2013.01); *B29B 7/70* (2013.01); *B29C 48/2511* (2019.02); *B29C 48/2517* (2019.02); *B29C 48/40* (2019.02); *B29C 48/402* (2019.02); *B29C 48/425* (2019.02); *B29C 48/59* (2019.02); *B29C 48/683* (2019.02)

(58) Field of Classification Search
    CPC ... B29C 48/2511; B29C 48/425; B29C 48/38; B29C 48/385; B29C 48/43; B29C 48/435; B29C 48/44; B29C 48/59; B29C 48/595; B29C 48/60; B29C 48/605; B29C 48/61; B29C 48/615; B29C 48/2517; B29C 48/402; B29C 48/40; B29C 48/405; B29C 48/41; B29C 48/415; B29C 48/683; B29B 7/485
    USPC .......................................................... 366/85
    See application file for complete search history.

(56) References Cited

U.S. PATENT DOCUMENTS

| | | | |
|---|---|---|---|
| 4,300,839 A * | 11/1981 | Sakagami | ........... B29C 47/0861 366/85 |
| 6,838,496 B1 | 1/2005 | Goedicke et al. | |
| 7,380,973 B2 | 6/2008 | Goedicke et al. | |
| 7,655,728 B2 * | 2/2010 | Nadella | ................... B29C 47/38 264/425 |
| 2004/0072920 A1 | 4/2004 | Goedicke et al. | |
| 2004/0141405 A1 * | 7/2004 | Blach | ..................... B29B 7/485 366/85 |
| 2005/0001350 A1 * | 1/2005 | Innerebner | .............. B29C 47/42 264/211.23 |
| 2005/0105382 A1 * | 5/2005 | Sturm | ..................... B29C 47/42 366/85 |
| 2006/0140048 A1 * | 6/2006 | Ulzheimer | ............. B29B 7/485 366/84 |
| 2007/0121421 A1 * | 5/2007 | Blach | ..................... B29B 7/485 366/85 |
| 2010/0067320 A1 | 3/2010 | Blach et al. | |
| 2013/0089634 A1 * | 4/2013 | Xu | ..................... B29C 47/0881 425/226 |

FOREIGN PATENT DOCUMENTS

| | | | | |
|---|---|---|---|---|
| DE | 10103094 A1 | 8/2001 | | |
| DE | 102006052610 A1 | 5/2008 | | |
| DE | 102008016862 A1 * | 10/2009 | ............ | B29B 7/485 |
| EP | 0788868 A1 | 8/1997 | | |
| EP | 1093905 A2 | 4/2001 | | |
| EP | 1462235 A1 | 9/2004 | | |
| EP | 1541870 A2 | 6/2005 | | |
| WO | 2011116965 A1 | 9/2011 | | |
| WO | WO-2011153951 A1 * | 12/2011 | ......... | B29C 47/0881 |

OTHER PUBLICATIONS

PCT International Search Report from International Application PCT/EP2013/060536, dated Sep. 30, 2013, 4 pages.

* cited by examiner

MULTI-SHAFT EXTRUDER

CROSS-REFERENCE TO RELATED APPLICATIONS

This application is a continuation of, and claims priority to PCT Application No. PCT/EP2013/060536, entitled MULTI-SCREW EXTRUDER WITH SELF-CLEANING CONVEYOR SCREW, filed May 22, 2013, which claims priority to an Austrian patent application, Austria Application No. A 608/2012, entitled MULTI-SHAFT EXTRUDER, filed May 22, 2013, all of which are incorporated herein by reference.

BACKGROUND

The invention relates to a multi-shaft extruder.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Market-leading self-cleaning type twin-screw extruders with tightly intermeshing co-rotating conveyor shafts essentially go back to DE 813 154 B and DE 862 668 B. On this basis, a modular construction system with a stripping profile formed by three circular arcs has been developed, which is today capable of meeting procedural requirements in wide areas.

Using a stripping profile with four or more profile-defining circular arcs according to DE 10 2008 029 303 A1, WO 2009/152974 A2 and WO 2011/039016 A1, dispersion and energy efficiency can be increased by a continuously differentiated profile curve.

In case of an extruder in which the conveyor shafts are arranged along a closed circle, it is the object to transport one third or more of the total throughput volume in the large-volume feed area of the product to the inner part of the two-piece process chamber. This results from the sustainable self-cleaning of the system, which takes place by the tight distribution of the process chamber in the pitch circle over the entire profile circumference into an outer part and an inner part.

EP 1 434 679 B1 discloses an axially non-tight system. It is characteristic for a tight system that the profile cross section continuously tapers from the core diameter. The same applies to the self-cleaning profile according to EP 1 423 251 B1, where numerous measures are proposed for the viscously wetted degassing area, which, depending on the production process and operating conditions, create uncontrollable dead space zones rendering sustainable production impossible. Furthermore, a ridge width is described in EP 1 423 251 B1 which could at best be possible for a single-flight profile.

The arrangement of a tightly intermeshing two-flight conveying profile of the conveyor shafts of a multi-shaft extruder with conveyor shafts arranged along a closed circle is shown in DE 101 22 462 C2. In comparison to an open system, this arrangement has the advantage that all conveyor shafts tightly intermesh with two adjacent shafts and closely strip each other and the barrel twice per rotation in all positions. In case of two-flight twin screws, this corresponds to a double cleaning of the barrel per rotation of the shafts, which, however, strip each other only once, what is normally sufficient.

It is the object of the invention to substantially improve the mixing, homogenisation and dispersion efficiency of a multi-shaft extruder.

According to the invention, this is achieved by the multi-shaft extruder characterized in claim 1. Advantageous embodiments of the invention are described in the sub-claims.

According to the invention, the multi-shaft extruder may have a plurality, i.e. at least three, of co-rotating, tightly intermeshing conveyor shafts arranged in parallel which may have at least two flights and are each guided in a bore in the extruder barrel.

Each conveyor shaft may be spaced with the ridge of one of its flights from the bore wall by a slight radial clearance. The radial clearance may not be more than three percent of the diameter of the bore.

In contrast, a gap may be formed between the ridge of one of the other flights of the conveyor shafts having at least two flights and the bore wall. This gap may be substantially larger than the said radial clearance between the at least one further ridge of the conveyor shaft and the bore wall but smaller than the flight depth of the conveyor shaft, thus smaller than the difference between the core diameter and the outer diameter of the conveyor shaft.

Adjacent conveyor shafts intermeshing with each other may each be arranged in an offset manner at an angle such that, on its flanks between its ridges, each conveyor shaft arranged between two conveyor shafts is coated with the free-flowing material to be processed by the gap-forming ridges of the two adjacent conveyor shafts in at least one rotational position, with the flanks being cleaned again from the free-flowing material by means of the ridges of the two adjacent conveyor shafts adjacent to the bore wall by a radial clearance in at least one further rotational position of the conveyor shaft.

The gap between the ridge and the barrel bore may have procedural functions.

In addition to the radial clearance, the conveyor shafts may have an axial clearance, which may be for self-cleaning. In particular, manufacturing tolerances, a varying twist of the conveyor shafts and thermal expansions are compensated, and the shafts are thus prevented from abutting against each other.

Even though the conveyor shafts can be designed with three or four flights, two-flight conveyor shafts are preferably used, thus conveyor shafts each with a first ridge having only a radial clearance from the barrel bore and e second ridge by which the said gap towards the barrel bore is formed.

The adjacent intermeshing two-flight conveyor shafts may be offset relative to each other at an angle of 90 degrees.

For this reason, in a rotational position, each two-flight conveyor shaft arranged between two conveyor shafts may be coated with the free-flowing material to be processed on its two flanks between the two ridges by means of the first ridges of the two adjacent conveyor shafts offset by 90 degrees forming a gap towards the barrel bore. By rotating the conveyor shafts from this position by 180 degrees, the two flanks of the interjacent conveyor shaft may be cleaned from the free-flowing material by the second ridges of the two adjacent conveyor shafts spaced from the bore wall by a clearance.

The conveyor shafts of the multi-shaft extruder can be arranged in a plane or, for example, along a circular arc.

Preferably, the conveyor shafts are arranged in the barrel along a closed circle at the same central angle distance.

That is to say that the barrel may comprise an outer barrel and a barrel core, wherein, on the inside of the outer barrel and on the outside of the barrel core, axially parallel, concave circular segments are provided the circle centre of which is in the cylindrical surface of the circle on which the axes of the conveyor shafts are located.

The cross-sectional profile of the conveyor shafts can be formed by three circular arcs, two of which correspond to the outer diameter and the cross section diameter of the shaft, respectively, whereas the third circular arc has a diameter which corresponds to the axial distance of two conveyor shafts. The cross-sectional profile of the conveyor shafts can also be formed by four or more circular arcs with continuously differentiated profile curves.

The conveyor shafts can be formed by worm shafts and/or kneading blocks, preferably by screw elements or kneading blocks which are mounted on bearing shafts so as to rotate therewith, for example by means of splines.

The conveyor shafts constructed according to the invention can extend over the total length of the process chamber of the extruder or only along a portion of the process chamber. That is to say that, in one or more areas of the process chamber, the conveyor shafts can also be constructed in such a manner that all of their ridges only have a clearance from the barrel bore, for example in a degassing area of the process chamber, e.g. by elements mounted accordingly.

In two-flight conveyor shafts, for example, according to the invention, the ridge of the conveyor shafts forming a gap conveys the free-flowing material under constantly changing conditions through the extruder quasi as a strip having a width as in case of a single-flight conveyor shaft with the same pitch. What is of particular importance is the transfer of the free-flowing material to the shaft which comes next in the direction of rotation at the transitions between two adjacent barrel bores. There, the conveying element releasing the free-flowing material and the conveying element receiving the free-flowing material approach each other and each form the mutual inner wall. For a short time, the total material volume in the intermeshing section is accelerated to twice the circumferential speed due to a change in flow direction. As a result, the shearing action of the ridge towards the barrel fails to appear, and the highly efficient elongational flows also have a homogeneous dispersion effect on the additionally generated strip volume. When reaching the subsequent barrel edge at the transition between the two barrel bores, the entire material is abruptly decelerated again under increased pressure to circumferential speed whilst generating new elongational flows with a change in flow directions.

Between the ridge diameter with a tight clearance and the barrel with a simple shear flow, the greatest part of the energy is generated in the product. However, this only contributes to an increase in temperature but not to the improvement of product quality. According to the invention, the one ridge may have a gap towards the barrel so that 50 percent are ruled out as a shear surface. On the way from intermeshing section to intermeshing section, the screw ridge may convey the material, which is generally rolling in front of the ridge diameter having a tight clearance from the barrel. By means of the ridge with a selectable gap towards the barrel, either a large-volume axial exchange of material from flight to flight or a matched combination of an elongational flow and a shear flow across the ridge can take place. When the two ridges enter the thus increased volume in the intermeshing section, the conditions change fundamentally. Being separated by the first ridge, the outer and the inner process chamber meet one another in the minor-inverted intermeshing section. The releasing conveying element and the receiving conveying element approach one another and form the mutual inner wall in a space which is convergent on all sides. The total material volume in the intermeshing section is immediately subject to double-speed conditions and, upon reaching the subsequent barrel edge, abruptly decreases again to circumferential speed with a change in flow directions. In an extruder having twelve shafts arranged along a circle, this is carried out twelve times in the circumferential direction each in the outer and inner process chamber and, depending on the requirements, can easily be extended to the entire length of the machine. The requirements in respect of effective surface areas and volume increase exponentially in cases where it is necessary to achieve in the product the maximum permissible particle sizes in the μm-range or nm-range. What is also decisive for the success is the residence time of the wetted particles in the effective gap and the viscosity of the continuous phase.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The invention will be described in more detail below by way of example with reference to the accompanying drawings. The drawings each show schematically in cross section.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

Figure 1:
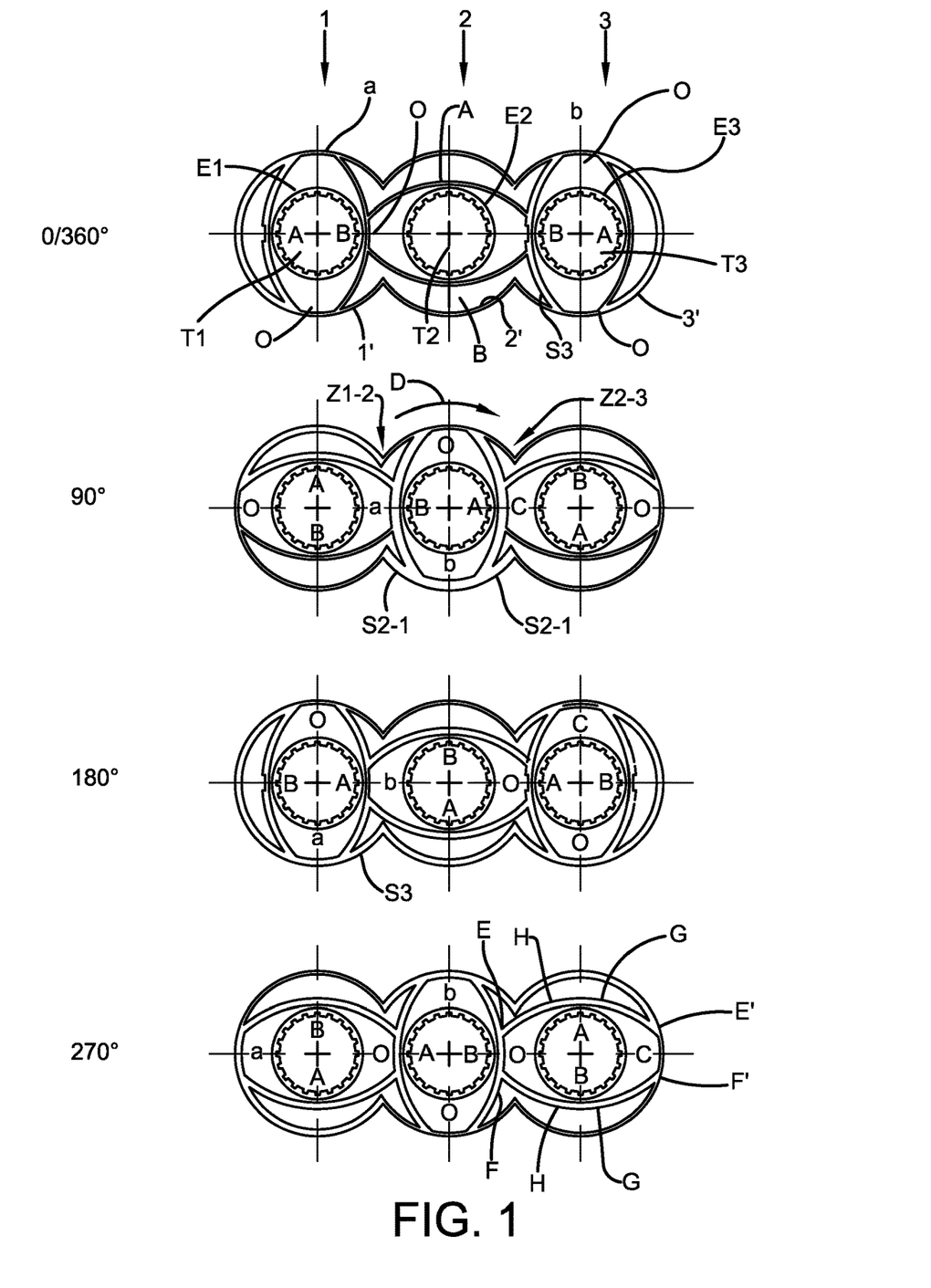
FIG. 1 shows an extruder with three two-flight conveying elements rotating in the same direction in a barrel, with the middle conveying element adopting a rotational position of 0/360°, 90°, 120° and 270°.

As shown in FIG. 1 in respect of the conveyor shaft 3, the profile of the conveyor shafts 1 to 3 may be formed by a circular arc E-F corresponding to the outer diameter of the conveyor shaft as well as a circular arc E'-F' being cut in relation to the circular arc E-F for forming the gap, and furthermore each flank A, B is formed by a circular arc G-H corresponding to the core diameter and two circular arcs E-H and G-E' and F-H and G-F', respectively, corresponding to the axial distance between adjacent conveyor shafts, i.e. between the conveyor shafts, thus in this case between the conveyor shafts.

According to FIG. 1, the extruder may have three tightly intermeshing two-flight conveyor shafts 1, 2, 3 arranged in parallel in a barrel with three barrel bores 1', 2', 3' and co-rotating in the direction of rotation D.

Each conveyor shaft 1, 2, 3 may comprise a bearing shaft T1, T2, T3 on which a two-flight conveying element E1, E2, E3 is mounted by means of splines so as to rotate therewith.

Each of the two-flight conveyor shafts 1, 2, 3 may have two ridges, namely a first ridge a, b, c which forms a gap towards the barrel bore 1', 2', 3' and a second ridge O with little clearance from the barrel bore 1', 2', 3'.

Between the first ridge a, b, c and the second ridge O, each conveyor shaft 1, 2, 3 may have the flanks A and B on either side.

At the transition from the barrel bore 1' to the barrel bore 2', the intermeshing section Z 1-2 is formed, and at the transition from the barrel bore 2' to the barrel bore 3', the intermeshing section Z 2-3 may be formed.

The first ridge b of the second conveyor shaft 2 may be offset relative to the first ridge of the first conveyor shaft 1 by 90 degrees, as is also the first ridge c of the third conveyor shaft 3 relative to the first ridge b of the second conveyor shaft 2.

When looking at the middle conveyor shaft 2 in the rotational position 0/360° in combination with the adjacent shafts 1 and 3, its second ridge O cleans the free-flowing material from the flank B of the conveyor shaft 1, whereas, on the flank B of the third conveyor shaft 3 in the intermeshing section Z 2-3, the layer S 3 may be formed from the free-flowing material to be processed by means of the ridge b of the second conveyor shaft 2.

In the 90-degree rotational position of the conveyor shaft, the ridge a of the conveyor shaft 1 may form a layer S 2-1 from free-flowing material on the flank B of the conveyer shaft 2 in the intermeshing section Z 1-2, whereas the a material layer S 2-2 may be formed on the flank A of the conveyor shaft 2 by means of the ridge c of the conveyor shaft 3. At the same time, the barrel bore 2' is coated by the ridge b of the conveyer shaft 2 and cleaned by the ridge O.

In the 180-degree rotational position of the conveyor shaft 2, the ridge b of the conveyor shaft 2 forms a material layer S 3 in the intermeshing section Z 1-2 on the flank A of the conveyor shaft 1, whereas the ridge O of the conveyor shaft 2 may clean the free-flowing material in the intermeshing section Z 2-3 from the flank A of the conveyor shaft 3.

In the 270-degree rotational position of the conveyor shaft 2, the ridge O of the conveyor shaft 1 cleans the flank A of the conveyor shaft 2 in the intermeshing section Z 1-2, whereas the ridge O of the conveyor shaft 3 may clean the free-flowing material from the flank B of the conveyor shaft 2.

That is to say that, in the one rotational position, namely the 90-degree rotational position, the conveyor shaft 2 may be coated with free-flowing material on its flanks A, B by means of the gap-forming first ridge a, c of the two adjacent conveyor shafts 1, 2 offset by 90 degrees, whereas, in a rotational position rotated further by 180 degrees, namely in the 270-degree rotational position of the conveyor shaft 2, the flanks A, B of the second conveyor shaft 2 may be cleaned again from the free-flowing material by means of the second ridges O of the two adjacent conveyor shafts 1, 3.

In the drawings, the layer of free-flowing material is indicated by thick lines.

Figure 2A:
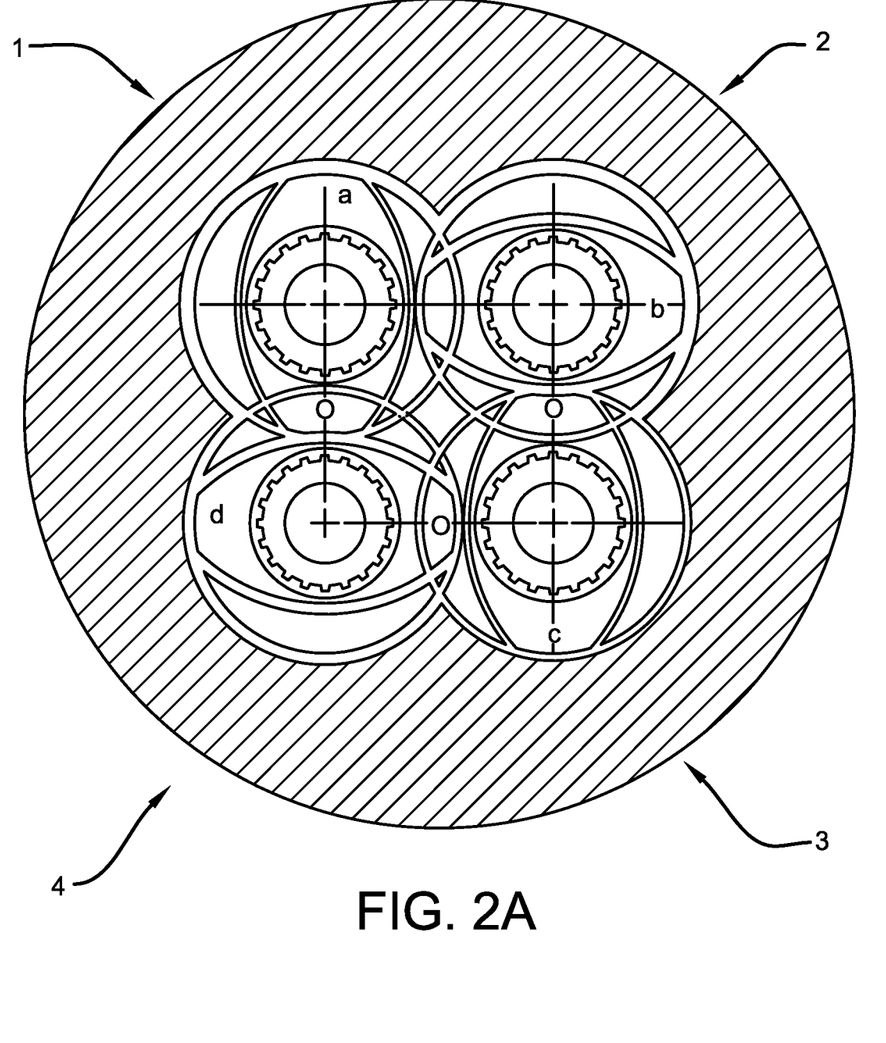
FIG. 2a an extruder with four two-flight conveyor shafts rotating in the same direction in a barrel and being arranged along a closed circle.
Figure 2B:
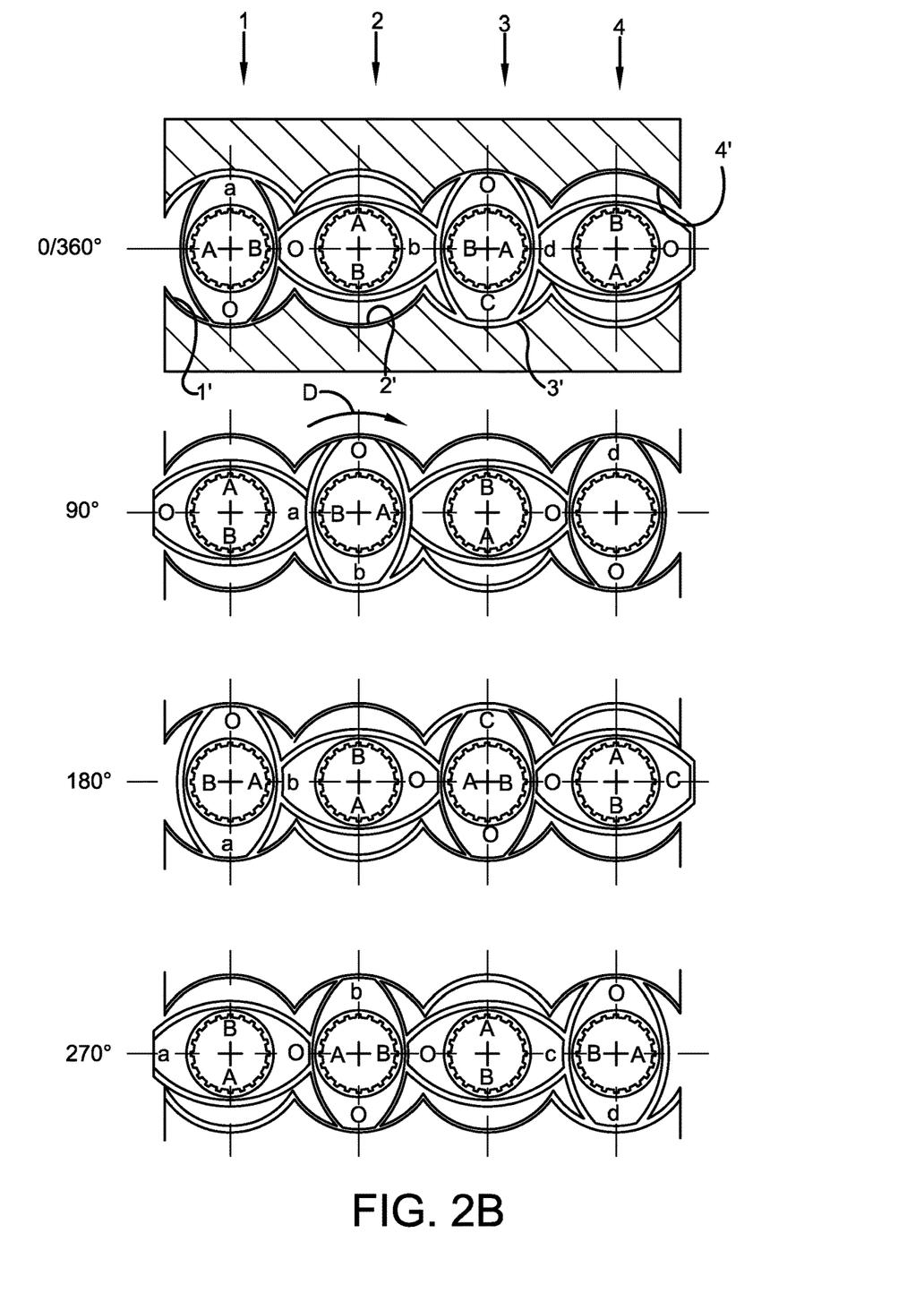
FIG. 2b shows the four conveyor shafts according to FIG. 2a shown in a plane, adopting a rotational position of 0/360°, 90°, 180° and 270°.

According to FIGS. 2a and 2b, the extruder 4 has conveyor shafts 1, 2, 3, 4 the rotation axes of which are arranged on a closed circle K.

According to FIGS. 2a and 2b, the two-flight conveying elements 1 to 4 each may have two ridges, namely a first ridge a, b, c, d forming a gap towards the barrel bore 1', 2', 3' and 4' and a second ridge O with little clearance from the barrel bore 1', 2', 3', 4'. Between the first ridges a, b, c, d and the second ridge O, each conveying element 1 to 4 may have the flanks A and B on either side.

The first ridge b of the second conveyor shaft 2 may be offset relative to the first ridge a of the first conveyor shaft 1 by 90 degrees, as is also the first ridge c of the third conveyor shaft 3 relative to the first ridge b of the second conveyor shaft 2 as well as the first ridge d of the fourth conveyor shaft 4 relative to the first ridge c of the third conveyor shaft 3.

Thus, between the two ridges O, b; O, c, each conveyor shaft 2, 3 between two conveyor shafts 1 and 3, 2 and 4 may be coated with free-flowing material on its flanks A, B in a rotational position, e.g. the shaft 3 in the rotational position of 0/360° and the shaft 2 in the rotational position of 90°, by means of the gap-forming first ridges b, d of the two adjacent conveyor shafts 2, 4 offset by 90 degrees and by means of the gap-forming first ridges a, c of the two adjacent conveyor shafts 1, 3 offset by 90 degrees, respectively, with the flanks A, B being cleaned again from the free-flowing material by means of the second ridges O of the two adjacent conveyor shafts 2, 4 and 1, 3, respectively, in a rotational position rotated by 180 degrees (180-degree rotational position of the shaft 3 and 270-degree rotational position of the shaft 2).

Figure 3A:
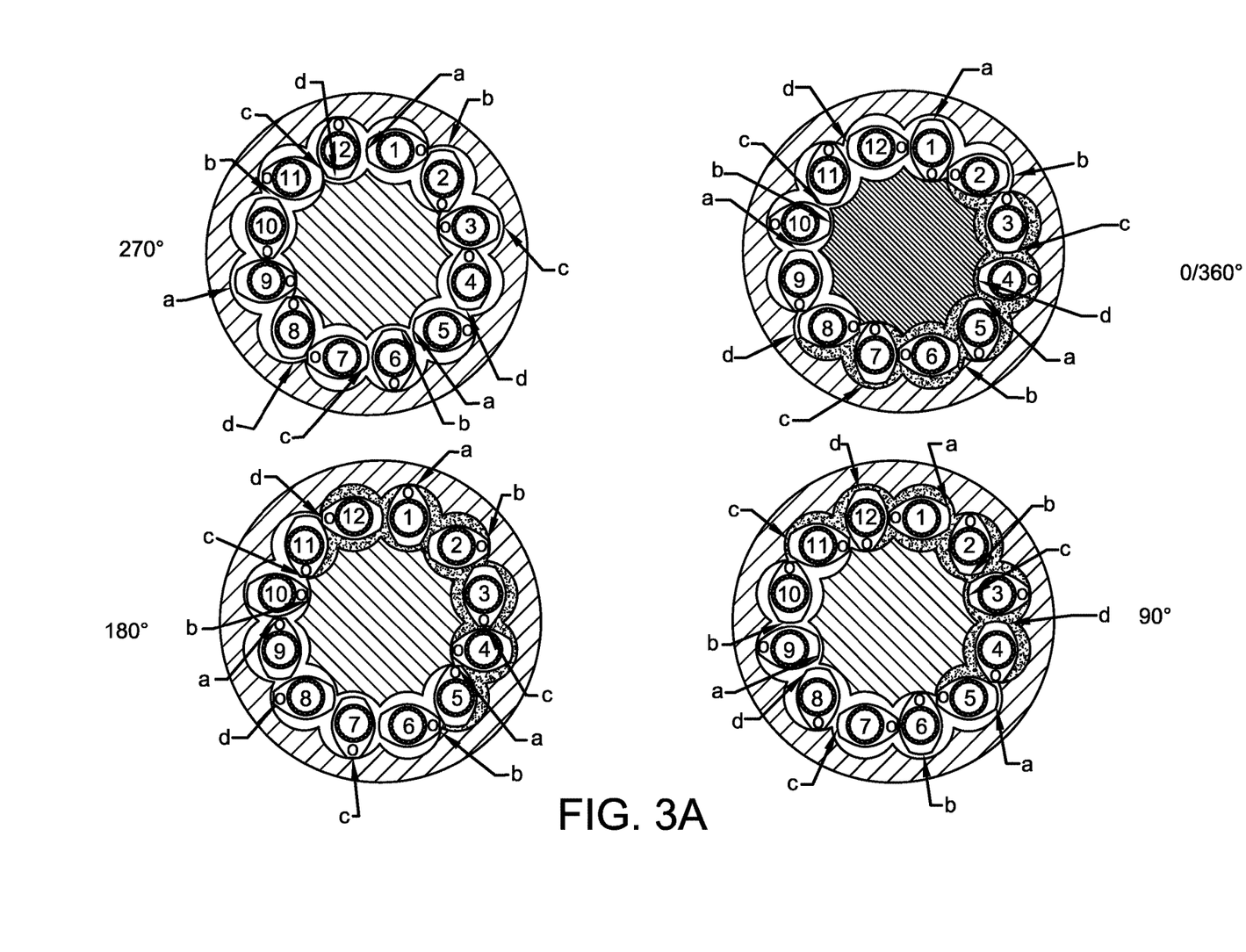
FIG. 3a shows an extruder with twelve two-flight conveyor shafts rotating in the same direction in a barrel and being arranged along a closed circle, adopting a rotational position of 0/360°, 90°, 180° and 270°.
Figure 3B:
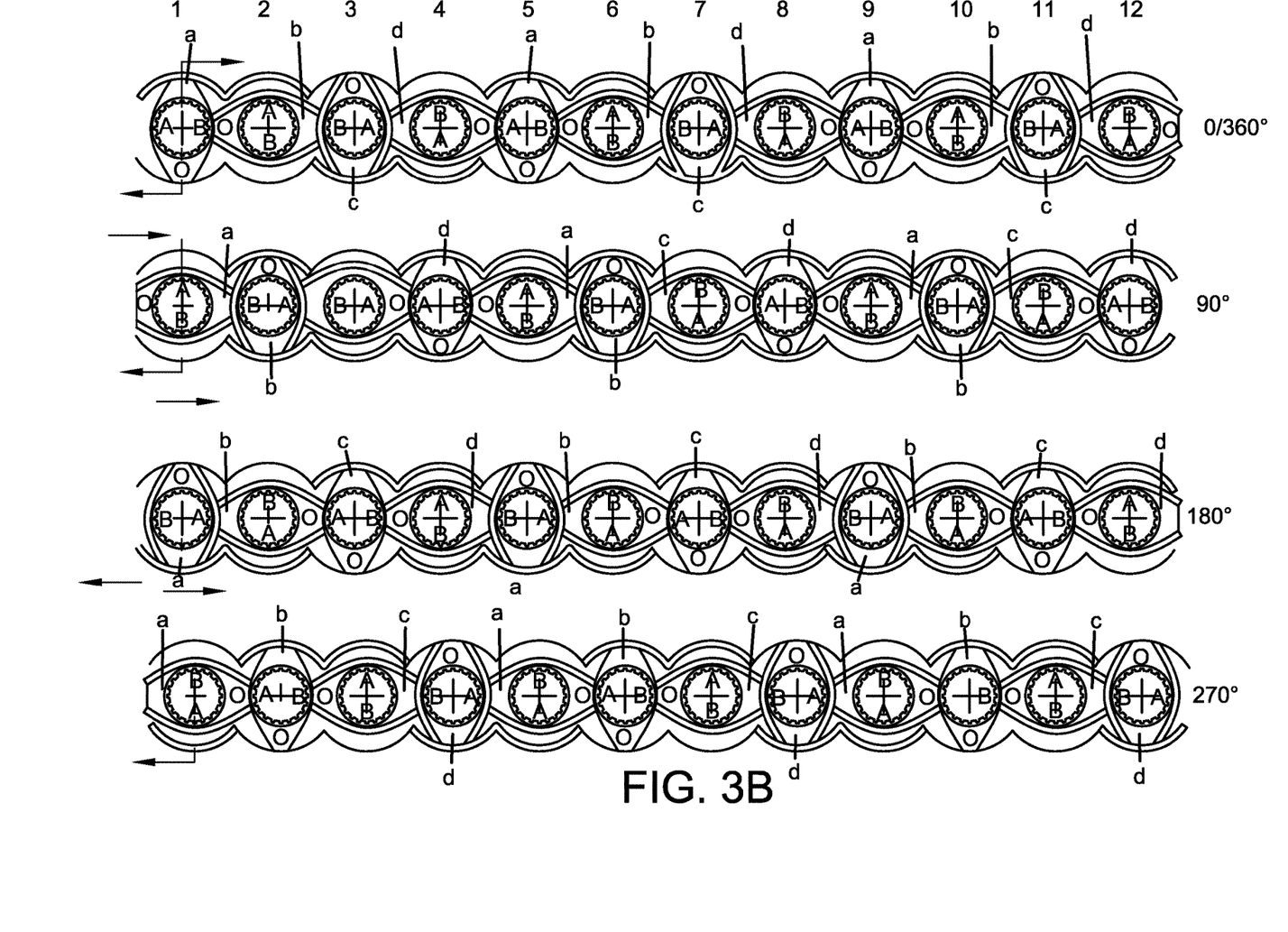
FIG. 3b the twelve conveyor shafts according to FIG. 3a shown in a plane, adopting a rotational position of 0/360°, 90°, 180° and 270°.

In the embodiment according to FIGS. 3a and 3b, twelve conveyor shafts 1 to 12 may be arranged in the barrel along a closed circle K circle at the same central angle distance. That is to say that the barrel may comprise the outer barrel G-1 and the barrel core G-2. On the inside of the outer barrel G-1 and on the outside of the barrel core G-2, axially parallel, concave circular segments may be provided the circle centres of which are in the cylinder on which the axes of the conveyor shafts 1 to 12 may be located.

According to FIG. 3a and FIG. 3b, each two-flight conveying element 1 to 12 may have two ridges namely a first ridge a, b, c, d, forming a gap towards the barrel bore and a second ridge O with little clearance from the barrel bore, wherein, in accordance with FIGS. 3a and 3b, the barrel bore may be formed by the two circular segments of the outer barrel G-1 and the barrel bore G-2 between which the respective conveyor shaft 1 to 12 may be mounted.

As can be seen from FIGS. 3a and 3b, the first ridge b of the second conveyor shaft 2 may be offset relative to the first ridge of the first conveyor shaft 1 by 90 degrees, as is also the first ridge c of the third conveyor shaft 3 relative to the first ridge b of the second conveyor shaft 2 and the first ridge d of the fourth conveyor shaft 4 relative to the first ridge c of the third conveyor shaft 3 etc.

It can be seen that the twelve conveyor shafts 1 to 12 according to FIGS. 3a and 3b may comprise three groups of four conveyor shafts each corresponding to the four conveyor shafts 1 to 4 according to FIGS. 2a and 2b. The twelve conveyor shafts 1 to 12 are thus coated and cleaned again in the same way as described in connection with FIGS. 2a and 2b.

According to FIG. 1, the conveyor shafts may have, as shown with respect to the shaft 3, a cross-sectional profile consisting of the circular arcs E-F, E'-F', H-G and E-H, G-E', F-H and G-F'. The circular arcs E-F and E'-F' run parallel to the bore wall 3'. The circular arc H-G has a diameter which corresponds to the core diameter, and the circular arcs E-H, G-E', F-H and G-F' may have a diameter which corresponds to the axial distance of the conveyor shafts 2 and 3. Thus, the circular arc E-F corresponds to the outer diameter of the shaft, whereas the circular arc E'-F' is cut in relation to the circular arc E-F for forming the gap. The cross-sectional profile can, however, also may be formed by four or more circular arcs with continuously differentiated profile curves.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A multi-shaft extruder for the processing of free-flowing material, comprising:
    a barrel and a plurality of co-rotating, tightly intermeshing conveyor shafts arranged in parallel, respective conveyor shafts guided in a bore of the barrel, and respectively comprising:
        a first flight comprising a first ridge that is spaced from a bore wall by a clearance over at least part of a processing length of the extruder, and
        a second flight comprising a second ridge forming a gap between the second ridge and the bore wall,
        a first flank and a second flank, substantially identical in profile and respectively disposed on opposite sides between the first ridge and the second ridge;
    respective conveyor shafts arranged in an offset manner relative to each other at an angle of ninety degrees such that at least:
        in a first rotational position, a first conveyor shaft that is arranged between, and adjacent to, a second and third conveyor shaft, is coatable with free-flowing material on its flanks between its first ridge and its second ridge from the gap formed by the respective second ridges of the second and third conveyor shaft; and
        in a second rotational position the flanks of the first conveyor shaft are cleanable of the free-flowing material by the respective first ridges of the second and third conveyor shafts, the second rotational position comprising rotation of the first, second, and third conveyor shafts by one-hundred and eighty degrees from the first rotational position.

2. The multi-shaft extruder according to claim 1, characterized in that the gap which is formed between the first ridge of the respective plurality of conveyor shafts and the corresponding bore wall is larger than the clearance between the second ridge of the respective plurality of conveyor shafts and the corresponding bore wall, and smaller than a flight depth of the respective plurality of conveyor shafts.

3. The multi-shaft extruder according to claim 1, characterized in that the clearance between the first ridge and the bore wall of the respective plurality of conveyor shafts is not more than three percent of the diameter of the bore.

4. The multi-shaft extruder according to claim 2, characterized in that the clearance between the first ridge and the bore wall of the respective plurality of conveyor shafts is not more than three percent of the diameter of the bore.

5. The multi-shaft extruder according to claim 1, characterized in that the conveyor shafts are arranged in the barrel along a closed circle at the same central angle distance.

6. The multi-shaft extruder according to claim 2, characterized in that the conveyor shafts are arranged in the barrel along a closed circle at the same central angle distance.

7. The multi-shaft extruder according to claim 3, characterized in that the conveyor shafts are arranged in the barrel along a closed circle at the same central angle distance.

8. The multi-shaft extruder according to claim 4, characterized in that the conveyor shafts are arranged in the barrel along a closed circle at the same central angle distance.

9. The multi-shaft extruder according to claim 1, characterized in that at least four conveyor shafts or a number of conveyor shafts corresponding to a multiple of four are provided.

10. The multi-shaft extruder according to claim 5, characterized in that at least four conveyor shafts or a number of conveyor shafts corresponding to a multiple of four are provided.

11. The multi-shaft extruder according to claim 1, characterized in that the conveyor shafts are formed by worm shafts and/or kneading blocks.

12. A multi-shaft extruder, comprising:
a barrel, comprising a plurality of barrel bores;
a first, second, and third co-rotating, conveyor shafts respectively disposed in a corresponding barrel bore, respective barrel bores disposed in parallel in the barrel, and respective conveyor shafts comprising:
 a first flight comprising a first ridge spaced from a wall of its barrel bore by a tight clearance over at least part of a processing length of the extruder; and
 a second flight comprising a second ridge forming a gap between the second ridge and the wall of its barrel bore, the gap being greater than the clearance;
a first flank and a second flank, substantially identical in profile and respectively disposed on opposite sides between the first ridge and the second ridge;
respective conveyor shafts rotationally disposed in an offset manner relative to each other in the barrel at an angle of ninety degrees, such that, in a first rotation of one-hundred and eighty degrees, the first and second flanks of the first conveyor shaft are operably coatable with free-flowing material flowing from the gap formed by the respective second ridges of the second and the third conveyor shaft, and in a second rotation of one-hundred and eighty degrees, the first and second flanks of the first conveyor shaft are operably cleanable of the free-flowing material by the respective first ridges of the second and the third conveyor shafts.

13. The multi-shaft extruder according to claim 12, characterized in that the gap which is formed between the first ridge, of the respective conveyor shafts and the bore wall is smaller than a flight depth of the conveyor shaft.

14. The multi-shaft extruder according to claim 12, characterized in that the clearance between the first ridge and the bore wall of the respective conveyor shafts is not more than three percent of the diameter of the bore.

15. The multi-shaft extruder according to claim 13, characterized in that the clearance between the first ridge and the bore wall of the respective conveyor shafts is not more than three percent of the diameter of the bore.

16. The multi-shaft extruder according to claim 12, characterized in that the conveyor shafts are arranged in the barrel along a closed circle at the same central angle distance.

17. The multi-shaft extruder according to claim 13, characterized in that the conveyor shafts are arranged in the barrel along a closed circle at the same central angle distance.

18. The multi-shaft extruder according to claim 14, characterized in that the conveyor shafts are arranged in the barrel along a closed circle at the same central angle distance.

19. The multi-shaft extruder according to claim 15, characterized in that the conveyor shafts are arranged in the barrel along a closed circle at the same central angle distance.

20. The multi-shaft extruder according to claim 19, characterized in that at least four conveyor shafts or a number of conveyor shafts corresponding to a multiple of four are provided.

* * * * *